(12) United States Patent
Pederson et al.

(10) Patent No.: US 6,552,469 B1
(45) Date of Patent: Apr. 22, 2003

(54) SOLID STATE TRANSDUCER FOR CONVERTING BETWEEN AN ELECTRICAL SIGNAL AND SOUND

(75) Inventors: Michael Pederson, Streamwood, IL (US); Peter V. Loeppert, Hoffman Estates, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 09/786,037
(22) PCT Filed: May 27, 1999
(86) PCT No.: PCT/US99/11761
§ 371 (c)(1), (2), (4) Date: May 8, 2001
(87) PCT Pub. No.: WO99/63652
PCT Pub. Date: Dec. 9, 1999

Related U.S. Application Data

(60) Provisional application No. 60/088,048, filed on Jun. 5, 1998.

(51) Int. Cl.$^7$ .................................................. H02N 1/00
(52) U.S. Cl. ....................................... 310/309; 381/191
(58) Field of Search ..................... 310/309; 251/129.17, 251/129.12; 381/190, 191

(56) References Cited

U.S. PATENT DOCUMENTS

| | | | |
|---|---|---|---|
| 1,825,232 A | * | 9/1931 | Huth et al. ................. 381/190 |
| 4,449,909 A | | 5/1984 | Kenworthy |
| 4,454,386 A | * | 6/1984 | Koyano ................. 179/110 A |
| 4,628,740 A | | 12/1986 | Ueda et al. |
| 4,776,019 A | | 10/1988 | Miyatake |
| 4,910,840 A | | 3/1990 | Sprenkels et al. |
| 5,295,194 A | * | 3/1994 | Christensen ................. 381/192 |
| 5,357,807 A | * | 10/1994 | Guckel et al. ................. 73/721 |
| 5,408,731 A | | 4/1995 | Berggrist et al. |
| 5,449,909 A | * | 9/1995 | Kaiser et al. ............. 250/336.1 |
| 5,490,220 A | * | 2/1996 | Loeppert ..................... 381/168 |
| 5,506,919 A | * | 4/1996 | Roberts ......................... 385/1 |
| 5,531,787 A | * | 7/1996 | Lesinski et al. .............. 623/10 |
| 5,638,946 A | * | 6/1997 | Zavracky ..................... 200/181 |
| 5,748,758 A | * | 5/1998 | Menasco, Jr. et al. ...... 381/176 |
| 5,831,262 A | * | 11/1998 | Greywall et al. ...... 250/227.14 |
| 5,870,482 A | * | 2/1999 | Loeppert ..................... 381/174 |

FOREIGN PATENT DOCUMENTS

JP  62-120200  *  6/1987  ........... H04R/19/02

* cited by examiner

*Primary Examiner*—Karl Tamai
(74) *Attorney, Agent, or Firm*—Wallenstein & Wagner, Ltd.

(57) ABSTRACT

A solid state transducer is disclosed. The transducer comprises a micromachined electrostatic actuator formed of silicon, a support brace disposed about the actuator, and a membrane coupled to the support brace. The actuator is operatively coupled to the membrane. The transducer may be either a receiver or a microphone.

13 Claims, 3 Drawing Sheets

MYLAR MEMBRANE (14)

SUPPORT BRACE (10)  ELECTROSTATIC CANTILEVER ACTUATOR (16)

SOLID STATE TRANSDUCER FOR CONVERTING BETWEEN AN ELECTRICAL SIGNAL AND SOUND

This application claims the benefit of provisional application No. 60/088,048, filed Jun. 5, 1998.

TECHNICAL FIELD

The present invention relates to solid-state transducers, such as receivers.

BACKGROUND OF THE INVENTION

The development of a successful solid-state transducer, such as a receiver, could be a major milestone regarding reduction of product complexity and fabrication cost. Acoustic solid-state actuators have until now received little attention by the research community, and designs presented so far are either based on piezoelectric or magnetic principles, similar to the actuators in the current receivers. The problem for the piezoelectric actuators is the small deflection (<1 $\mu$m) which can be produced. For a receiver, this will require some significant enhancement and translation to generate a deflection large enough, which normally leads to big reduction of the available force. The magnetic actuators suffer the same drawbacks as existing receivers, regarding power consumption and critical dependence on magnetic properties. In fact, it has proved very difficult so far to produce good magnetic materials in micromachined structures.

SUMMARY OF THE INVENTION

It is an object of the invention to provide a solid state transducer. In accordance with the invention, the transducer comprises a micromachined electrostatic actuator formed of silicon, a support brace disposed about the actuator, a membrane coupled to the support brace and means for operatively coupling the actuator to said membrane.

It is contemplated that the transducer may be either a receiver or a microphone.

DETAILED DESCRIPTION

Figure 1:
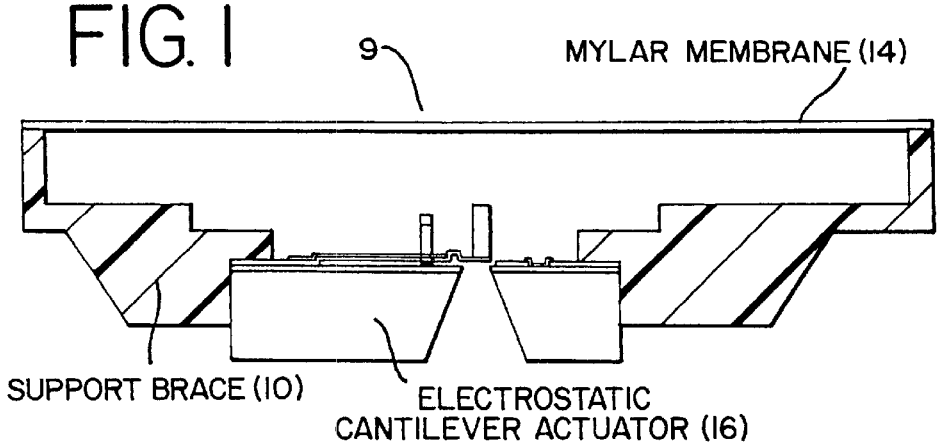
FIG. 1 is a sectional view of a solid state receiver according to the present invention wherein the cantilever has not yet been attached to the membrane.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The following describes a receiver based on an electrostatic actuator. The major advantage of this receiver is that it has zero DC power consumption, a "close-to" linear operation, and can be assembled from only 3 separate pieces. The complete assembly, shown in FIG. 1, consists of a metal support brace 10 onto which a polymer (Mylar) membrane 14 is attached, and an electrostatic actuator 16 on silicon.

The use of the brace 10 reduces the area of silicon required for the actuator 16 and therefore the production cost. To further reduce the cost, the brace 10 can be made in plastic (i.e., injection molding).

The actuator 16 in the receiver 9 is a silicon nitride cantilever, which translates large electrostatic forces out-of-plane from the silicon chip to the polymer membrane 14. Micromachining of the actuator is required to realize dimensions small enough to create the large electrostatic force, which drives the receiver.

Basic Function

Figure 2:
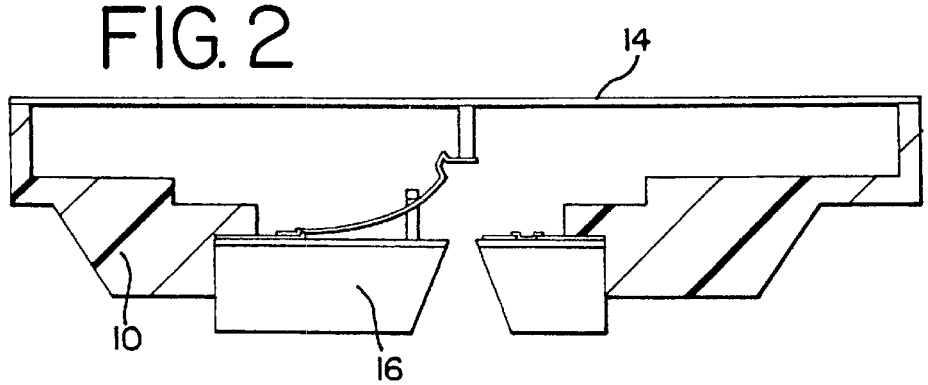
FIG. 2 is a sectional view of the receiver of FIG. 1, wherein the receiver is in equilibrium (no actuator voltage)
Figure 3:
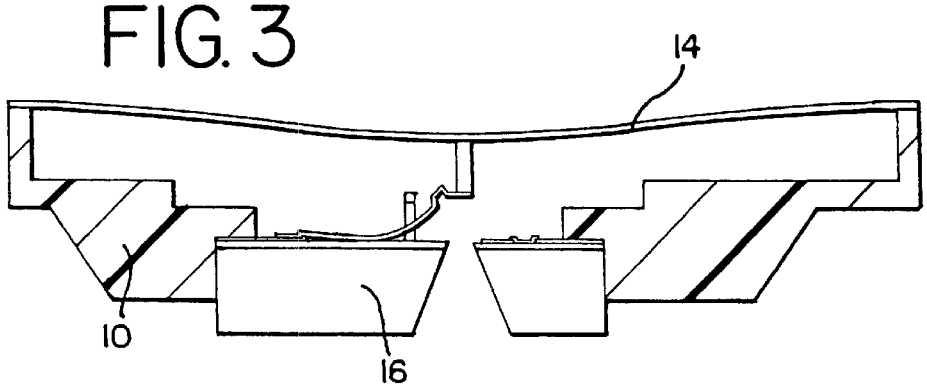
FIG. 3 is a sectional view of the receiver of FIG. 1, wherein the receiver is actuated.
Figure 4:
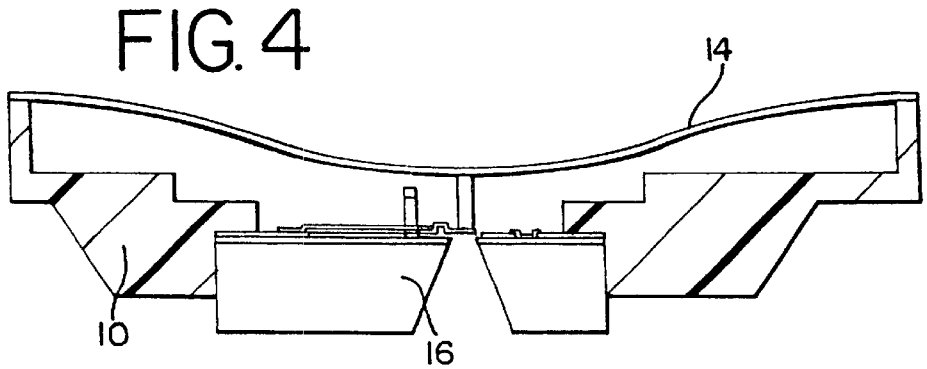
FIG. 4 is a sectional view of the receiver of FIG. 1, wherein the receiver is actuated with the backside evacuated.
Figure 5:
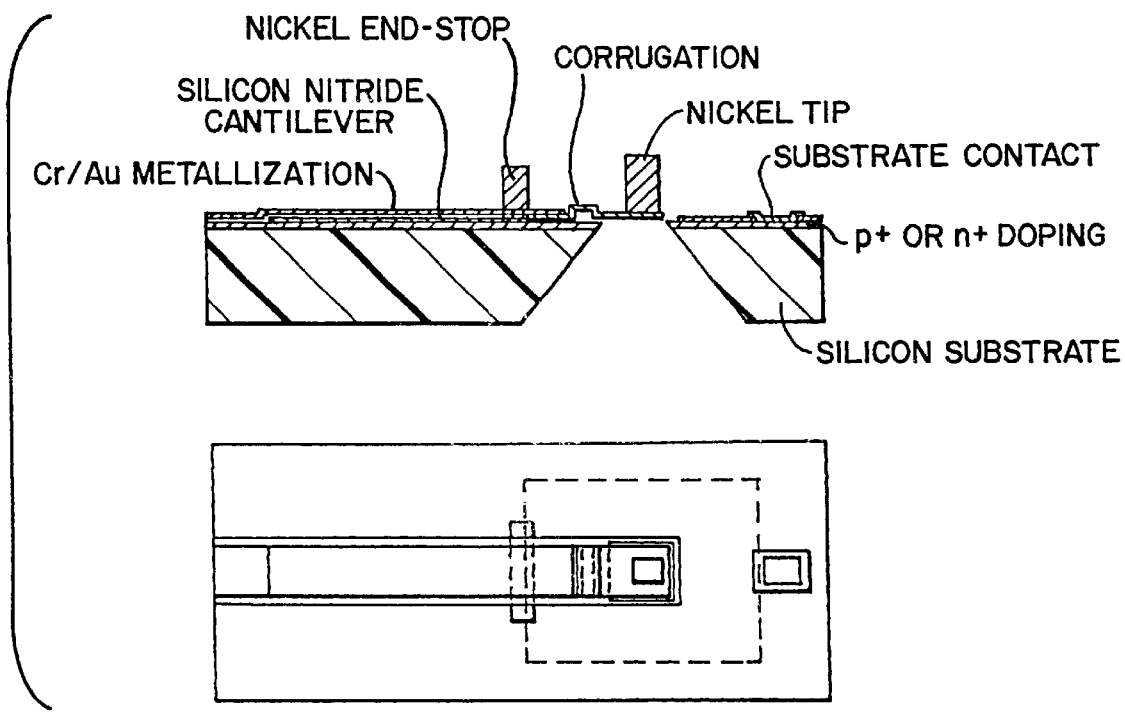
FIG. 5 is a cross-section and a top view of the receiver of FIG. 1, illustrating the general fabrication process of the receiver.

As illustrated in FIG. 5, the actuator is basically a silicon nitride cantilever which has a chrome/gold metal layer on top. The cantilever is anchored to the silicon substrate in one end, and attached to the polymer membrane in the other. Dimensions of the support brace are chosen such that in the static state of equilibrium, the cantilever will deflect away from the substrate (FIG. 2). If an electrical potential is applied between the metal layer on the cantilever and the silicon substrate, large electrostatic attraction forces will be generated in the small air gap near the anchor point of the cantilever. The forces will pull the cantilever towards the substrate in a rolling motion, resulting in a deflection of the polymer membrane (FIG. 3) and eventually in a flat cantilever (FIG. 4). Since the electrostatic forces are very big compared to the restoring forces of the polymer membrane, very large deflections can be created in this manner. When the electrical potential is removed, the restoring forces of the membrane will return the cantilever to the initial position. Dynamic operation of the receiver can be achieved by controlling the level of the actuator voltage and/or the duration of which it is applied.

Issues in Design

In order to secure a sufficient bandwidth of the device, a number of problems must be considered. Firstly, the compliance of the membrane and the cantilever must be low enough to ensure a sufficiently high resonance frequency of the device. This can be done by adjusting the tension in the membrane and the dimensions of the cantilever. Secondly, a high enough roll-off frequency must be realized by reducing the damping from air streaming in the narrow gap under the cantilever. This can be done by perforating the silicon nitride cantilever. As for other devices, it is important to maintain a damping large enough to reduce the resonance peak of the device. Fortunately, since the driving forces in the electrostatic actuator are so large, a relatively low compliance can be allowed, resulting in a high resonance frequency.

To reduce the bending moments induced on the cantilever near the point of attachment to the membrane, a corrugation can be added to the cantilever. This will virtually remove the effect of the bending moments and give the cantilever a higher compliance. The cantilever should have a compliance much higher than the membrane, to allow the desired position of equilibrium (FIG. 2).

In assembly, tolerance must be considered. Even with the most precise components and tools, a tolerance of at least ½ mil (13 μm) for the attachment of the membrane and the actuator on to the support brace must be included. Assuming a total stroke of 20 to 50 μm, ½ mil is a serious variation. However, by adding an end-stop to the actuator, one can precisely define the maximum travel of the of the actuator. If the support brace is dimensioned in such a manner that, within the tolerance, the actuator is always fully deflected in equilibrium, the assembly tolerance will only result in a variation of the static deflection of the membrane. And since the restoring forces of the membrane are small compared to the forces in the actuator, the influence of any static deflection on the actuator performance will be small.

Assembly

Firstly, the polymer membrane is attached and tensioned on the brace. The silicon actuator die is mounted upside-down on a flex circuit (i.e. flip-chip), which provides electrical contact to the actuator (not shown on illustrations). A droplet of RTV (epoxy) is placed in the center of the membrane, and the flex with the actuator is attached to the brace. A soft vacuum is then applied from the backside, which causes the membrane to deflect and the center to be clamped against the nickel tip of the cantilever (FIG. 4). After hardening the RTV (epoxy), the vacuum is removed and the membrane returns to its static position, now with the cantilever attached to the center. The device can then be placed in any appropriate housing.

Actuator Fabrication

The general fabrication process for the silicon actuator, shown in FIG. 5, is as follows:
1. LPCVD nitride
2. Pattern nitride on front †
3. 1st sacrificial oxide layer
4. Pattern 1st sacrificial layer †
5. 2nd sacrificial oxide layer
6. Pattern 2nd sacrificial layer †
7. PECVD nitride for cantilever
8. Pattern nitride †
9. Cr/Au metallization+plating base
10. Pattern Cr/Au layer †
11. St polyimide plating mold †
12. 2nd polyimide plating mold †
13. Ni-plating of tip and end-stop
14. Pattern backside nitride †
15. KOH-etch of ventilation hole(s)
16. Etch sacrificial oxide layer
(†=Lithography step)

The creation of the nickel tip and end-stop will be critical, since it requires very thick plating in the order of 50 μm to 100 μm. A mold for the plating can be made with polyimide or PMMA, which both can be patterned with sufficient resolution with conventional UV lithography. The aspect ratio of the mold will not be high. However, it is not important for this application. Extensive knowledge of plating of very thick nickel layers is available from the LIGA processes. The polymer mold can be removed after plating or simply dissolved during KOH etching of the ventilation hole(s).

Actuator Dimensions

The compliance of the cantilever in the actuator is critical for the device to function properly. A low compliance is desirable to get a high resonance frequency as well as the best possible transfer of the actuator force to the center of the membrane in the receiver. On the other hand, a high compliance of the cantilever is useful to ensure that with the package tolerance, the actuator is always at the end-stop in the static situation. Naturally, the compliance must be high enough to deflect it by the restoring forces of the membrane, to create the proper static situation at all. Care must therefore be taken, when designing the actuator, to find an optimum compliance which can fulfill these needs. The best shape of the cantilever will be either a simple straight bar, or a wedged design where the cantilever is wider near the attachment area to the membrane than by the anchor point. A wedged design will give the highest compliance, as well as help to somewhat linearize the operation of the receiver.

Theory of Operation

A simple quasi static model for the receiver can be derived by assuming that the bending moments induced on the cantilever and membrane from the area of attachment are small.

The center deflection of a uniformly loaded thin circular membrane with clamped edges, which is stretched in the middle plane (deflection>thickness), is given by:

$$w_0 = 0.662 a_m \sqrt[3]{\frac{q a_m}{E_m h_m}} \quad (1)$$

where a is the radius of the membrane (meters), q is the uniform pressure (pascal), $E_m$ is Young's modulus (pascal), and $h_m$ is the thickness of the membrane (meters). From small deflections theory it is known that a membrane loaded by a force $F_c$ (Newtons) in the center has a center deflection equal to a uniformly loaded membrane with the following force:

$$F_{u,eq} = \frac{\pi}{4} F_c \quad (2)$$

Dividing this force by the membrane area and substituting in (1) gives:

$$w_0 = 0.662 a_m \sqrt[3]{\frac{F_c}{4 a_m E_m h_m}} \quad (3)$$

The tip deflection of a straight cantilever loaded purely by a force $F_c$ at the tip is given by:

$$w_c = \frac{4F_c L^3}{Wh_c^3 E'} \quad (4)$$

where L is the length, W is the width, $h_c$ is the thickness, and E' is the flexural modulus of the cantilever. In the quasi static situation, a force balance exists between the restoring forces of the membrane and the cantilever. Assuming the receiver was assembled with an initial spacing $d_{init}$ between the membrane and the actuator tip before the two were attached, in the situation of force balance the following relation apply:

$$d_{init} = w_0 + w_c = 0.662 a_m \sqrt[3]{\frac{F_c}{4a_m E_m h_m}} + \frac{4F_c L^3}{Wh_c^3 E'} \quad (5)$$

Solving this equation for $F_c$ yields the quasi static counteracting forces, and from this the deflections $w_0$ and $w_c$ can be calculated.

If an electrical potential is applied to the actuator, an additional force is generated. This force adds to the restoring force of the cantilever, thereby establishing a new point of force balance. A detailed analysis of the complex problem involving electrostatic forces will be required to fully understand the properties of the actuator, however, a simple estimate of the function can be derived using the following principle. Considering the operation of the receiver shown in FIGS. 2 to 4, it is clear that the electrostatic forces will attract the cantilever from the anchor point onwards. This action is (in the static situation) somewhat similar to assuming that the effective length of the cantilever is shortened. If one calculates the force at this new point of force balance (i.e., FIG. 3) and subtracts the force in equilibrium (no actuator voltage applied) one can deduct how much electrostatic force is required in the region where the cantilever is flat to maintain this situation. Similarly, if a certain actuator voltage is applied, one can deduce where the new point of force balance is, and consequently deduce the deflection of the membrane. The electrostatic force on the flat collapsed (=no air under) cantilever is given by:

$$F_{c,el} = \frac{\varepsilon_{SiN} \varepsilon_0 V^2}{2h_c^2} WX \quad (6)$$

where $\varepsilon_{SiN}$ is the relative permittivity of the silicon nitride cantilever material, $\varepsilon_0$ is the absolute vacuum permittivity, V is the actuator voltage, and X is length of the collapsed region of the cantilever.

To illustrate the model, a receiver with the following dimensions was analyzed:

| MYLAR MEMBRANE: | | | |
|---|---|---|---|
| Size: | 3 mm (diam) | Thickness: | 5 μm |
| Modulus: | 3 GPa | | |
| ACTUATOR: | | | |
| Cantilever width: | 200 μm | Cantilever length: | 700 μm |
| Dielectric constant: | 8*ε₀ | Flexural modulus: | 167 GPa |
| Cantilever thickness: | 1 and 2 μm | | |
| Initial clearance between tip and membrane before attach: | | | 50 μm |

First, (5) was solved for $F_c$ to find the initial forces and deflections in the structure. For a cantilever thickness of 1 μm the equilibrium force was found to be 1.1 μN, and the deflections were 3.9 μm and 46.1 μm for the center of the membrane and the tip of the cantilever, respectively. For the more rigid 2 μm cantilever the numbers are: 8.5 μN, 6.1 μm and 43.9 μm. In both cases it can be seen that the membrane is much stiffer than the cantilever (as intended), whereby most of the initial clearance is transferred to deflection of the cantilever. If one assumes the effect of the electrostatic forces corresponds to moving the anchor point towards the point of attachment to the membrane (shortening the cantilever), it is possible to calculate with (5) the forces and deflections in these new points of equilibrium (FIG. 6).

Figure 6:
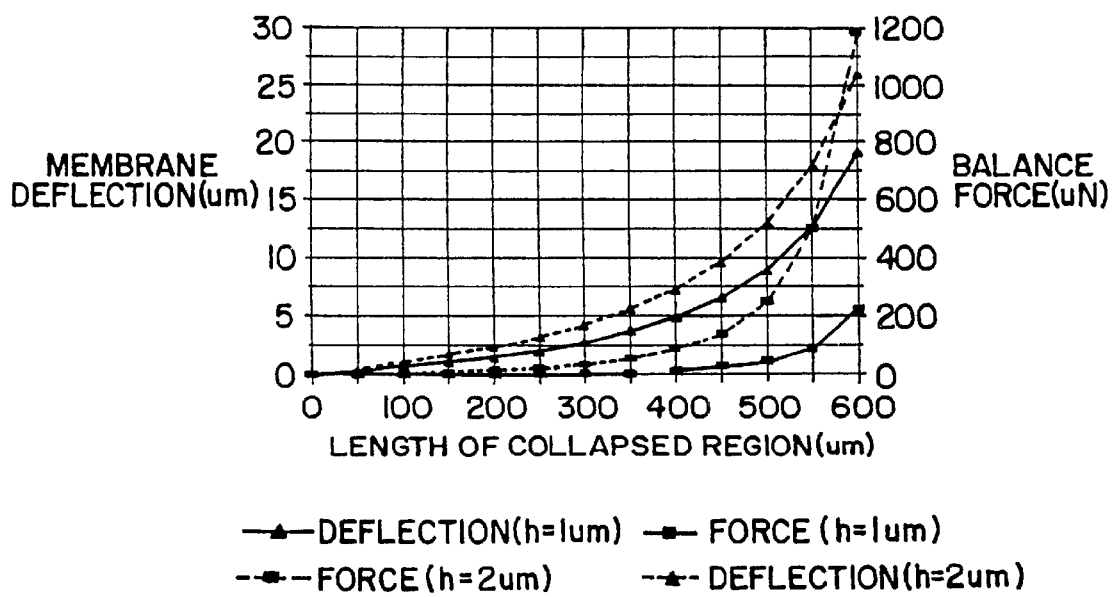
FIG. 6 is a graphic illustration of simulated change of membrane deflection and equilibrium force vs. effective length of cantilever.
Figure 7:
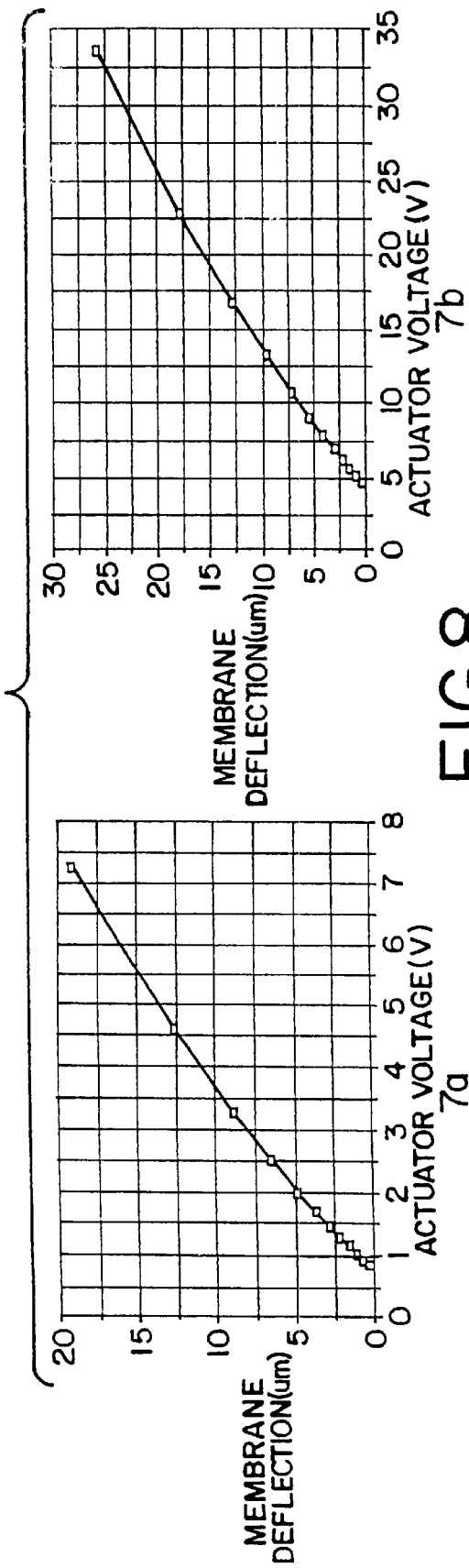
FIGS. 7a and b are graphic illustrations of simulated membrane deflection vs. actuator voltage, for cantilever thickness of 1 $\mu$m (left) and 2 um (right)

From FIG. 6, it can be seen that the equilibrium force increases as the effective length of the cantilever decreases. This means that the electrostatic forces must also increase to keep the cantilever collapsed. Fortunately, the electrostatic force increases as the collapsed region increases according to (6). Using the relation between balance force and deflection shown in FIG. 6 and (6), the relation between actuator voltage and membrane deflection can be found (FIG. 7).

Figure 8:
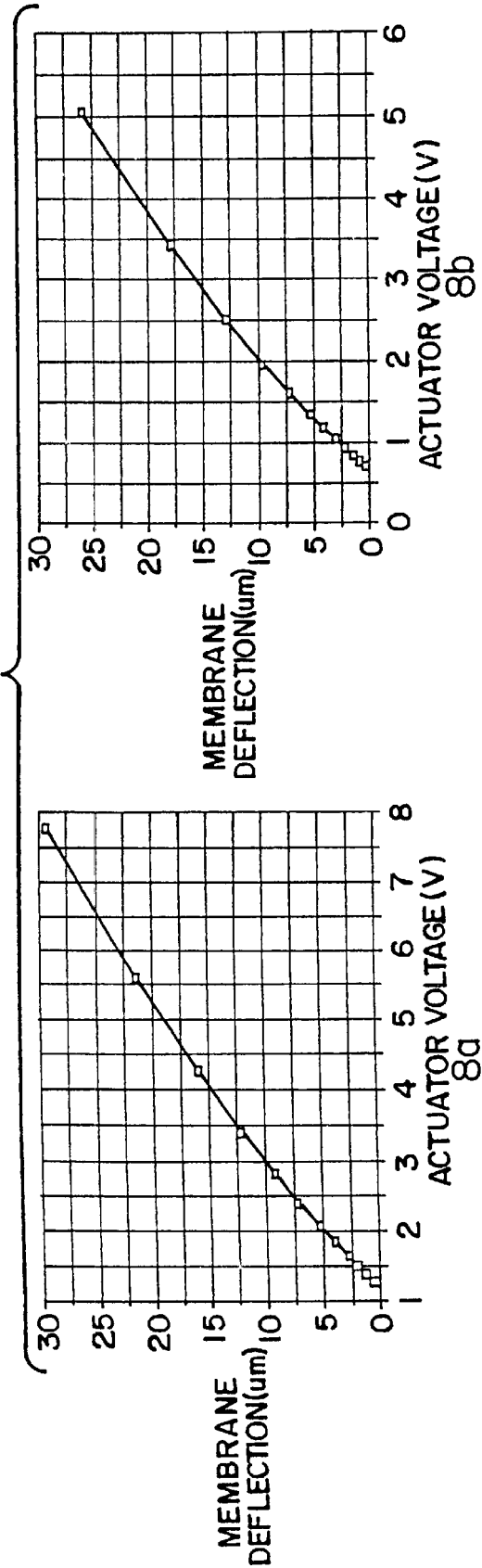
FIGS. 8a and b are graphic illustrations of simulated membrane deflection vs. actuator voltage with actuator electrode placed on the underside of cantilever, for cantilever thicknesses of 2 $\mu$m (left) and 3 $\mu$m (right).

It can be seen that the thicker cantilever provides a longer stroke. However, the forces (voltages) required are significantly higher. Furthermore, since the metal electrode is on top of the cantilever, the thicker layer will cause a reduction of the available electrostatic forces. If the electrode is placed on the underside of the cantilever, which from a processing point of view is slightly more difficult, the effect of the thickness on the electrostatic forces can be eliminated. Assuming that only a thin nitride layer of 3000 Å remains on the substrate under the cantilever, for the purpose of electrical insulation, a significant reduction of the actuator voltage can be realized. In FIG. 8, the curve for the 2 μm thick cantilever is shown again (left) together with a simulation of a 3 μm thick cantilever.

In principle an even greater thickness of the cantilever will further increase the stroke, however, the thickness will be limited by the fabrication process (PECVD in this case). According to these results, a 3 μm cantilever will produce a stroke of about 29 μm for an actuator voltage of 7.8 V, which results in a situation where the cantilever is collapsed in a 600 μm long region. Assuming, the receiver is operated around the center point of the full stroke length, allowing positive and negative changes, the maximum deflection is 14.5 μm. A membrane center deflection of 14.5 μm corresponds to a volume deflection ΔV of approximately $0.5 w_0 \pi a^2 = 0.051$ mm³, which in a 2 cc coupler results in a sound pressure of 25.6 ubar or 102 dB SPL.

The dimensions of the actuator and membrane chosen in this example are by no means optimized, and higher sound pressures and better linearity of the operation of the receiver can be realized. However, detailed theory and simulation will be required to understand the dynamic response of the receiver, to find the dimensions best suited for the application.

While the specific embodiment has been illustrated and described, numerous modifications come to mind without significantly departing from the spirit of the invention and the scope of protection is only limited by the scope of the accompanying claim.

I claim:

1. A solid state transducer for converting between an electrical signal and sound comprising:

an actuator comprising a silicon substrate having a doped portion, a metallization layer and an electrostatic cantilever disposed between the metallization layer and the silicon substrate wherein when a potential difference exists between the silicon substrate and the metallization layer a deflection force is incident upon the cantilever;

a support brace disposed about the actuator which supports the actuator; and a membrane coupled to the support brace and to the cantilever.

2. The transducer of claim 1 wherein said transducer comprises a receiver.

3. The transducer of claim 1 wherein said transducer comprises a microphone.

4. The transducer of claim 1 wherein the actuator has a range of motion which is long compared to the thickness of the membrane.

5. The transducer of claim 1 wherein the cantilever is coupled to the membrane by a tip.

6. The transducer of claim 5 wherein the tip is made from nickel.

7. The transducer of claim 1 further comprising an end stop which prevents over-deflection of the cantilever in at least one direction.

8. The transducer of claim 1 wherein the cantilever comprises a corrugated portion.

9. Of The transducer of claim 1 further comprising an end stop to prevent over-deflection of the cantilever in at least one direction.

10. The transducer of claim 9 wherein the end-stop is made from nickel.

11. The transducer of claim 1 wherein the cantilever is attached to the membrane by a tip.

12. The transducer of claim 11 wherein the tip is made from nickel.

13. The transducer of claim 1 wherein the metallization layer is comprises a chrome/gold metallization layer.

* * * * *

UNITED STATES PATENT AND TRADEMARK OFFICE
CERTIFICATE OF CORRECTION

PATENT NO.    : 6,552,469 B1
DATED         : April 22, 2003
INVENTOR(S)   : Michael Pedersen et al.

It is certified that error appears in the above-identified patent and that said Letters Patent is hereby corrected as shown below:

<u>Title page,</u>
Item [75], inventor, name should read -- Michael Pedersen --, not "Michael Pederson"

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,552,469 B1 Page 1 of 1
DATED : April 22, 2003
INVENTOR(S) : Pedersen et al.

It is certified that error appears in the above-identified patent and that said Letters Patent is hereby corrected as shown below:

<u>Column 8,</u>
Line 8, please delete "Of The transducer" and insert -- The transducer --.
Lines 8-9, please delete "end stop" and insert -- end-stop --.
Line 19, please delete "layer is comprises" and insert -- layer comprises --.

Signed and Sealed this

Eighteenth Day of November, 2003

JAMES E. ROGAN
*Director of the United States Patent and Trademark Office*